3,150,950
WORKING GLASS
Thomas D. English, Jr., Pittsburgh, Pa., and David C. Rich, Houston, Tex., assignors to Pittsburgh Plate Glass Company, Pittsburgh, Pa., a corporation of Pennsylvania
No Drawing. Filed Oct. 3, 1960, Ser. No. 59,807
4 Claims. (Cl. 65—62)

This invention relates to removing portions of tempered glass and more particularly to cutting, drilling and edging tempered glass.

Tempered glass is produced by heating glass to a temperature near but below its softening point and above its strain point followed by rapidly chilling, as by blowing air against its surfaces. As such, the skin or external layer of the glass is in compression and the core thereof is in tension. Of course, the mechanical and thermal properties of glass so treated are enhanced. When the compressive skin is severely damaged the tempered glass fractures into a large number of relatively small particles. Thus, cutting tempered glass by the usual glass cutting techniques of scoring and breaking, drilling tempered glass by the usual drilling techniques and edging tempered glass by the usual edging techniques have been considered impossible, so that fabrication of the base glass has been accomplished prior to the tempering operation.

It has been found possible by the present invention to cut, drill or edge tempered glass using the traditional glass working techniques without fracturing the glass into the large number of relatively small particles. Thus, portions of tempered glass may be removed to fabricate specific articles.

Therefore, the primary object of this invention is the provision of a method for removing portions of tempered glass. Other objects are provisions of methods for cutting, drilling and edging tempered glass.

In proceeding according to this invention, a sheet of tempered glass is heated to a temperature below the strain region and is then cooled rapidly. The planes of glass near the surface will cool more rapidly than those near the center. However, the surface planes are not free to contract because they are bonded to the interior planes and hence, the surface of the glass is put into tension and the center into compression. The resulting stress distribution through the glass thickness is approximately parabolic and reverse of the stress distribution in tempered glass which is also approximately parabolic.

The stress introduced into the tempered glass by reheating to a temperature below the strain region and chilling is temporary whereas the tempered stresses are permanent. The temporary stress counteracts the permanent stress and brings the glass temporarily into a lower energy state. When the temporary stress is equal and opposite to the permanent stress the resultant stress is zero. Therefore, at this precise moment the glass is effectively in a dead annealed condition. While this condition is desirable, it is only necessary to counteract the major portion of the permanent stress to follow the teachings of this invention.

The glass is scored in the usual glass cutting manner, as with a wheeled glass cutter, either prior to the reheating and chilling operation or after the reheating and chilling operation, and the cut is run when the induced temporary stress counteracts the major portion of the permanent stress in the glass. When the glass is scored prior to the reheating and chilling operation, the depth of the score should extend to a depth less than the depth of the compressive skin in the tempered glass. After the cut has been run the glass is allowed to cool to the ambient temperature. The glass portions revert to their original tempered energy state, so that the original permanent stress remains.

In a similar manner, when the induced temporary stress counteracts the major portion of the permanent stress, the glass is drilled or edged using conventional glass drilling and edging equipment. The drilling and/or edging operations may follow the cutting operations; however, separate heat treatments of the tempered glass will be required because of time considerations in maintaining the substantially stress-free energy state of the tempered glass.

Determination of the exact time when the cut can be run is accomplished by examination of the strain pattern. For example, this examination may be performed by passing polarized light through the sample and then through an optical system including a collecting lens, a calibrated quartz wedge, a polaroid lens at 90° to the polaroid lens of the light source and a focusing lens. The quartz wedge technique is generally known for observing stress in glass samples.

As will be apparent the present method offers useful possibilities in the manufacture of tempered glass articles. In the process of tempering glass, the glass must be supported by means such as tongs or other devices which mar the surface and other portions of the glass. By cutting these articles out of larger pieces of glass it is possible to remove the marred portions. It is also possible to stockpile large pieces of tempered glass and fabricate unusual or single items therefrom, greatly facilitating their supply to their ultimate user.

We claim:

1. A method of cutting tempered glass which comprises heating said glass to a temperature below its strain region thus maintaining the permanent stress within the glass, thereafter rapidly cooling said heated tempered glass, said heating and rapid cooling inducing temporary stress into said glass which counteracts a major portion of the permanent stress therein, scoring said glass and, while said temporary stress is induced, running said cut.

2. A method as recited in claim 1 wherein said scoring said glass precedes said inducing said temporary stress into said glass, said score extending to a depth less than the depth of the compressive skin on said tempered glass.

3. A method as recited in claim 1 wherein said scoring said glass follows said inducing said temporary stress into said glass.

4. In a method of cutting a heat strengthened sheet of glass, the steps comprising scoring a surface of the glass to a depth less than the depth of the glass that is under a permanent compressive stress, heating the glass to an elevated temperature just below its strain region, rapidly cooling the glass to counteract permanent compressive stress and, while permanent compressive stress is counteracted, breaking the glass along the score.

References Cited in the file of this patent

UNITED STATES PATENTS

| 2,148,630 | Lillie et al. | Feb. 28, 1939 |
| 2,177,324 | Long | Oct. 24, 1939 |
| 2,243,149 | Despret | May 27, 1941 |
| 2,293,537 | Ferlito | Aug. 18, 1942 |
| 2,311,846 | Littleton et al. | Feb. 23, 1943 |
| 2,539,159 | Peiler | Jan. 23, 1951 |

FOREIGN PATENTS

| 159,110 | Australia | Sept. 29, 1954 |